UNITED STATES PATENT OFFICE.

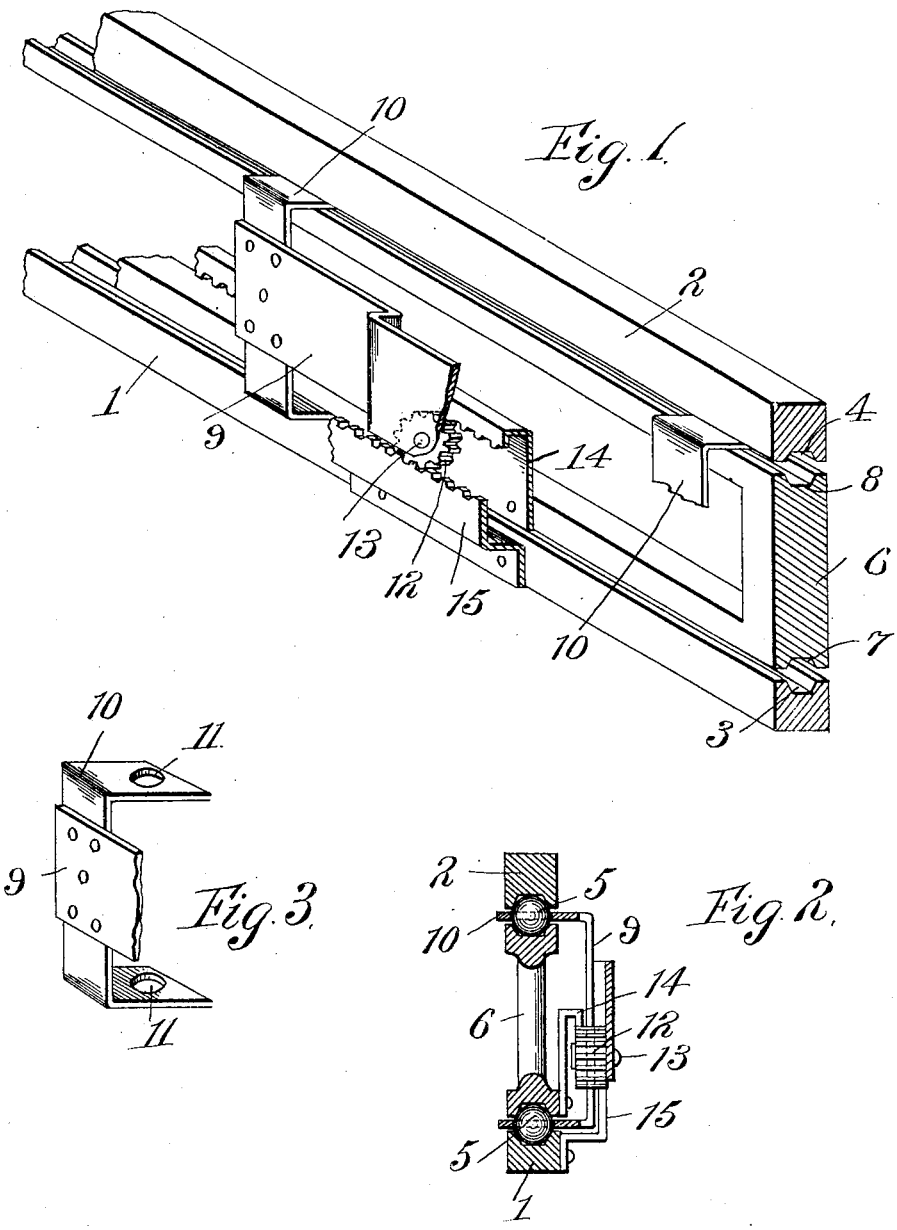

GEORGE W. CAMPBELL, OF NEW YORK, N. Y.

ANTIFRICTION-BEARING.

No. 805,839. Specification of Letters Patent. Patented Nov. 28, 1905.

Application filed September 20, 1904. Serial No. 225,175.

*To all whom it may concern:*

Be it known that I, GEORGE W. CAMPBELL, a citizen of the United States, and a resident of the borough of Manhattan, in the city, county, and State of New York, have invented certain new and useful Improvements in Antifriction-Bearings, of which the following is a specification.

My present invention relates to antifriction-bearings, and has for its object to provide a means for maintaining the relative positions between two or more antifriction-rollers and between said rollers and the carriage adapted to be guided by and travel on said rollers.

My invention is especially adaptable to typewriting machines, printing-presses, and the like. In the accompanying drawings I have illustrated the same as applied to the structure of a type-writing machine.

In said drawings like reference-numerals refer to like parts.

Figure 1 is an isometric projection of a portion of a type-writing machine provided with my improved antifriction-bearing. Fig. 2 is a transverse section through the same, and Fig. 3 is a detail perspective view of a portion of the roller-holder forming part of such mechanism.

Referring now in detail to the drawings, 1 represents the lower track-bar or guideway, mounted on the frame of a type-writing machine, and 2 the upper track-bar or guideway, suitably mounted on the machine-frame and having suitable antifriction-roller grooves 3 4, respectively, in their opposing faces, adapted to receive antifriction-rollers 5, Fig. 2.

6 is a carriage or a portion of a carriage having grooves 7 and 8 in its lower and upper edges, respectively, to receive antifriction-rollers 5 and corresponding to grooves 3 4 in the track-bars 1 2. Carriage 6 is sustained between the track-bars 2 by antifriction-rollers 5. Rollers 5 are maintained at definite distances apart by a roller-holder 9, having perforated forks 10 of suitable number, in the perforations 11 of which antifriction-rollers 5 are seated. In the structure herein illustrated the holder 9 is forked at each end to accommodate four of the antifriction-rollers 5; but it is obvious that any number of antifriction-rollers 5 may be employed to sustain the carriage 6 between the track-bars 1 2 and that the holder 9 may be forked a suitable number of times to accommodate said rollers 5.

In devices of this character there is a great tendency of the antifriction-bearings to "creep," and thereby to decrease the distance between the rollers 5, so that the feed of the carriage becomes uneven and unsteady. This "creeping" is caused by the jar of the carriage in operation. In order to avoid friction between the carriage 6 and the rollers 5, it is essential that said rollers travel at one-half the rate of speed of the travel of the carriage and that the proper relative positions of the rollers 5 and the carriage 6 at all times be maintained—that is, it would be equally unsatisfactory were all of the rollers 5 while maintaining their proper correlative positions to creep as a unit relatively to the carriage 6. In order, therefore, to maintain a proper speed of travel, I have geared the holder 9, through means of a suitable pinion 12, Figs. 1 and 2, to the carriage 6 and the track-bar 1 or other portion of the machine-frame. Pinion 12 is mounted on the stud 13, seated in holder 9, and engages a rack 14, positioned on the carriage 6. Pinion 12 also engages a rack 15, shown in the drawings as positioned on the track-bar 1, but which may be on any stationary part of the frame. The rack 14 engages the pinion 12 at a point on the periphery of said pinion diametrically opposite to the point on the periphery of the pinion 12 engaged by the rack 15.

The operation of my device is as follows: The rack 15 is stationary. The rack 14 travels over the pinion 12, and the pinion 12 travels over the rack 15. Since the speed of a moving lever is at all times twice as great at its outer end as it is at a point central between said outer end and the fulcrum of said lever, drawing an imaginary lever the fulcrum of which is the rack 15, the outer end of which is the rack 14, and the point central between said outer end and fulcrum on which is the stud 13, upon which the pinion 12 is mounted, it will be obvious that the rack 14 will travel at twice the rate of speed of the stud 13. In view of this it will take the pinion 12 twice as long to travel the length of the rack 15 as it will take the rack 14 to travel the length of the rack 15, and hence the movement of the holder 9 will be limited to one-half the speed of the rack 14. Hence the movement of the rollers 5 will be limited to one-half the speed of the movement of the carriage 6, whereby the proper relative positions between the rollers 5 as a unit and the carriage 6 will be maintained.

I do not wish to be limited to the exact details of structure herein shown and described, since the same may be varied without departing from the spirit of my invention.

Having thus described my invention, the following is what I claim as new therein and desire to secure by Letters Patent:

1. In an antifriction-bearing, the combination with a guideway, an antifriction-roller traveling in said guideway, a carriage sustained by said roller, a stationarily-mounted rack, a holder for said roller, a pinion carried by said holder and traveling on said stationary rack, and a rack mounted to travel with the carriage and traveling on said pinion.

2. In an antifriction-bearing, the combination with a guideway, an antifriction-roller in said guideway, and a carriage sustained by said antifriction-roller, of a stationary rack, a holder for said roller, a pinion mounted on said holder and traveling on said rack, and a rack mounted to travel with said carriage traveling over said pinion and propelling said pinion along said stationary rack.

3. In an antifriction-bearing, the combination with a guideway, an antifriction-roller mounted to travel in said guideway, and a carriage sustained by said antifriction-roller, of a roller-holder for said roller, a pinion mounted on said holder, a stationary rack engaging one side of said pinion, and a rack mounted to travel with said carriage engaging a point on the periphery of said pinion diametrically opposite to the point engaged by said stationary rack.

GEORGE W. CAMPBELL.

Witnesses:
WILLIAM F. HEILAND,
B. F. FREEMAN.